3,143,541
MONOAZO DYESTUFFS
Meinrad Hürbin and Guido Schetty, Basel, Switzerland, assignors to J. R. Geigy A.-G., Basel, Switzerland
No Drawing. Filed Dec. 10, 1962, Ser. No. 243,619
Claims priority, application Switzerland Dec. 14, 1961
5 Claims. (Cl. 260—199)

The present invention concerns new monoazo dyestuffs, processes for the production thereof, their use for the dyeing of fibres containing polyamide as well as, as industrial product, the polyamide fibres fast dyed with the aid of the new dyestuffs.

It has been found that valuable monoazo dyestuffs are obtained by coupling a diazotised aminodiphenyl ether sulphonic acid having a hydrocarbon substituent with at least 4 carbon atoms in a weakly acid to weakly alkaline medium with a coupling component of formula

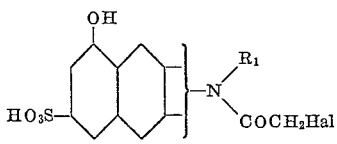

to form a dyestuff of formula

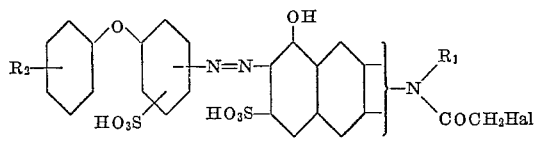

In the Formulae I and II, $R_1$ represents a hydrocarbon radical such as alkyl, preferably with not more than 5 carbon atoms, or benzyl, chlorobenzyl, bromobenzyl or methylbenzyl, and Hal represents halogen such as bromine or, preferably, chlorine, and in Formula II $R_2$ is a hydrocarbon radical as defined below and having at least 4 carbon atoms. The components are so chosen that the sum of the C atoms of $R_1$ and $R_2$ is at least 9.

The hydrocarbon substituent $R_2$ of the diazo component is either an alkyl radical with at least 4 and preferably not more than 18 carbon atoms, or a cycloalkyl, aralkyl or aryl radical. Normal, secondary or tertiary butyl radicals, an amyl, hexyl octyl, decyl, dodecyl, or tetradecyl radical are mentioned as alkyl radicals; examples of cycloalkyl radicals are the cyclohexyl radical, or a methylcyclohexyl radical. As aralkyl radicals, the benzyl, or phenethyl radicals can be employed and the phenyl radical or a methylphenyl can be used as aryl radicals.

The coupling is performed in the usual way, if necessary at elevated temperature. To accelerate the coupling reaction, water-miscible organic solvents such as lower alkanols, e.g. methanol or ethanol, or ether alcohols such as ethylene glycol monomethyl or monoethyl ether, lower aliphatic ketones such as acetone, or lower fatty acid amides such as dimethyl formamide can be added to the reaction mixture. The term "lower" always means maximally 5 carbon atoms.

In many cases, the coupling products precipitate by themselves but in some cases only after the addition of sodium chloride. They can be isolated by filtration. Sometimes purification of the crude products by recrystallisation is to be recommended. A modification of the process for the production of the monoazo dyestuffs according to the invention consists in coupling a diazotised aminodiphenyl ether sulphonic acid containing a hydrocarbon substituent having at least 4 and preferably not more than 18 carbon atoms, in a weakly alkaline medium with a coupling component of Formula III

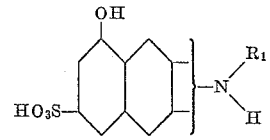

wherein $R_1$ represents a hydrocarbon radical as mentioned above under Formula I and reacting the coupling product obtained with a halogen containing acetylating agent, e.g. chloro- or bromo- acetic acid chloride or bromide, to form a dyestuff of Formula II, the components being so chosen that the sum of the C atoms of $R_1$ and $R_2$ is at least 9.

The new monoazo dyestuffs dye fibres containing polyamide, particularly those of natural origin, principally wool but also silk or leather, as well as synthetic polyamide fibres, e.g. nylon, from a neutral to acid, but preferably from a weakly acid bath, in level orange-red to scarlet shades. To improve the water solubility, these dyestuffs may be mixed with slight amounts of basic salts, particularly with alkali phosphates such as tetrasodium pyrophosphate or with wetting agents having a dispersing action such as higher alkylaryl sulphonates or polyalkylene oxide-fatty acid condensation products.

The new compounds of Formula II, and particularly those of formula

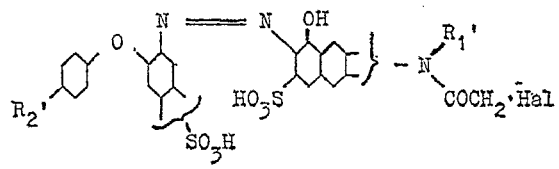

wherein
$R_1'$ represents alkyl, preferably with 3 to 5 carbon atoms, or aralkyl as mentioned above in defining $R_1$ of Formulas I and II,
$R_2'$ represents a hydrocarbon substituent as defined above, containing at least 4 carbon atoms, particularly an alkyl group with at least 4 and preferably not more than 18 carbon atoms,
with the proviso that the sum of the carbon atoms of $R_1'$ and $R_2'$ is at least 9, and
Hal is chlorine or bromine draw very satisfactorily on to fibers containing natural or synthetic polyamide from a weak acid medium, for instance an acetic acid bath, and they produce very pure orange-red to scarlet dyeings which are of excellent wet fastness properties and are fast to light.

Dyestuffs according to the invention with optimal properties, among those described above, are the dyestuffs of the formula

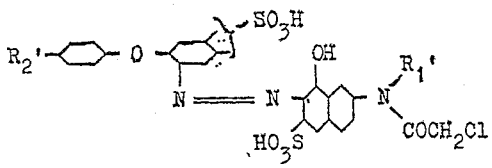

wherein $R_1'$ and $R_2'$ have the meaning given above under Formula IV.

The wool dyeings obtained with the new monoazo dyestuffs differ from those of similar known monoazo dyestuffs, particularly from those in which $R_1+R_2$ is less than 9, by their better wet fastness properties, particularly their fastness to washing, milling, sea water and rubbing.

Further details can be seen from the following examples. Where not otherwise expressly stated, parts are given as parts by weight. The temperatures are in degrees centigrade. The relationship of parts by weight to parts by volume is as that of grammes to cubic centimetres.

EXAMPLE 1

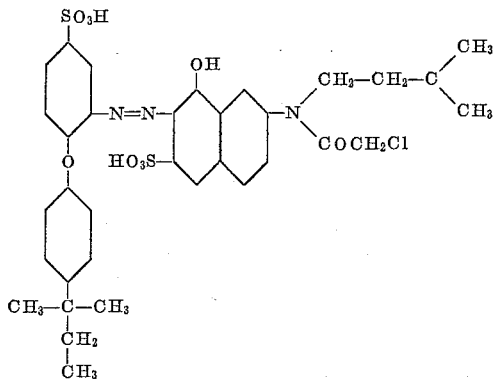

33.5 parts of 4'-tert-amyl-2-aminodiphenyl ether-4-sulphonic acid, in the form of the sodium salt, are dissolved in 300 parts of water, 6.9 parts of sodium nitrite are added and the solution is added dropwise while stirring at 0–5° to 30 parts of concentrated hydrochloric acid and 150 parts of water. The diazo suspension is stirred for 1 hour at 0–5° and is then poured into an acetic acid solution of the sodium salt of 38.55 parts of 2-chloroacetyl-isoamylamino-8-hydroxynaphthalene - 6 - sulphonic acid and 35 parts of crystallised sodium acetate in 400 parts of water and 200 parts of formamide. The coupling mixture is stirred for several hours, then heated to 60° and 30 parts of sodium chloride are added. The dyestuff which precipitates is filtered off and dried. It dyes wool from a weakly acetic acid bath in pure scarlet shades which have excellent wet fastness properties.

EXAMPLE 2

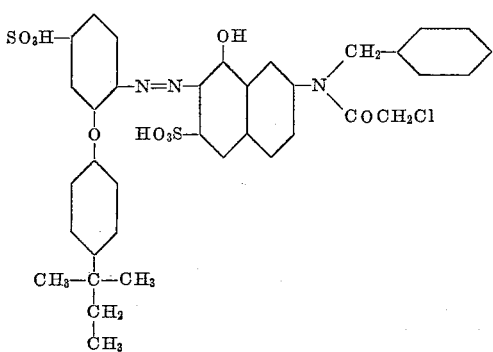

33.5 parts of 4'-tert.amyl-2-aminodiphenyl ether-5-sulphonic acid, in the form of the sodium salt, are dissolved in 300 parts of water, 6.9 parts of sodium nitrite are added and the solution is added dropwise while stirring at 0–5° to 30 parts of concentrated hydrochloric acid and 200 parts of water. The diazo suspension is stirred for another 2 hours at 0–5° and then poured into an acetic acid solution of the sodium salt of 40.55 parts of 2-chloroacetyl - benzylamino - 8 - hydroxynaphthalene-6-sulphonic acid and 40 parts of crystallised sodium acetate in 600 parts of water. The coupling mixture is stirred for several hours, the precipitated dyestuff is filtered off under suction and dried. It is a red powder which, with the addition of a polyphosphate, dissolves in water. The solution has a vivid red colour. The dyestuff dyes wool in pure scarlet shades. The dyeings have good fastness to light and excellent wet fastness properties.

EXAMPLE 3

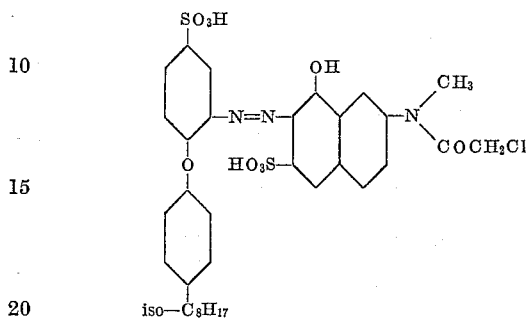

37.7 parts of 4'-isooctyl-2-aminodiphenyl ether-4-sulphonic acid, in the form of the sodium salt, are dissolved in 400 parts of water at 40°, 6.9 parts of sodium nitrite are added and the warm solution is added dropwise to a solution of 30 parts of concentrated hydrochloric acid and 100 parts of water while cooling at 3–8°. The diazo suspension is stirred for another 2 hours at 5–8° and then poured into an acetic acid solution of the sodium salt of 32.95 parts of 2-chloroacetyl-methylamino-8-hydroxynaphthalene-6-sulphonic acid and 35 parts of crystallised sodium acetate in 600 parts of water and 400 parts of formamide at 0–5°. The reaction mixture is cooled for several hours, then heated to room temperature and it is stirred overnight. Finally, it is heated to 70° and 75 parts of sodium chloride are added. After cooling, the precipitated dyestuff is filtered off and dried. It is an orange-red powder. From a neutral to weakly acid bath it dyes wool in pure reddish orange shades which have excellent fastness to washing, milling and sea water.

Similar dyestuffs are obtained when, in the above example, 40.55 parts of 2-chloroacetyl-benzylamino-8-hydroxynaphthalene-6-sulphonic acid or 38.55 parts of 2-chloroacetyl - isoamylamino-8-hydroxynaphthalene-6-sulphonic acid are used as coupling component.

EXAMPLE 4

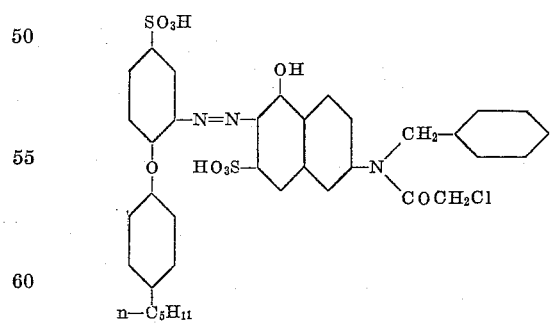

33.5 parts of 4'-n-amyl-2-aminodiphenyl ether-4-sulphonic acid are diazotised as described in Example 1 and coupled at 0–5° with a solution of the sodium salt of 40.55 parts of 2-chloroacetyl-benzylamino-5-hydroxynaphthalene-7-sulphonic acid and 40 parts of crystallised sodium acetate in 600 parts of water. On completion of the coupling, the dyestuff is precipitated by sprinkling in 200 parts of sodium chloride and it is purified chromatographically. It dyes wool from a weakly acid bath in pure orange shades which are fast to wet and light.

Further dyestuffs are given in the following table which are obtained by the methods described in Examples 1 to 4.

Table

| No. | Diazo component | Coupling component | Shade on wool |
|---|---|---|---|
| 1 | 4'-butyl-2-aminodiphenyl ether-4-sulphonic acid. | 2-chloroacetyl-benzylamino-8-hydroxynaphthalene-6-sulphonic acid. | Scarlet. |
| 2 | 4'-tert.amyl-2-aminodiphenyl ether-5-sulphonic acid. | 2-bromoacetyl-benzylamino-8-hydroxy-naphthalene-6-sulphonic acid. | Do. |
| 3 | 4'-cyclohexyl-2-aminodiphenyl ether-4-sulphonic acid. | 2-chloroacetyl-benzylamino-8-hydroxy-naphthalene-6-sulphonic acid. | Do. |
| 4 | 4'-tert.amyl-4-aminodiphenyl ether-2-sulphonic acid. | -----do----------------- | Do. |
| 5 | 4'-n-amyl-4-aminodiphenyl ether-3-sulphonic acid. | 2-chloroacetyl-isoamylamino-8-hydroxynaphthalene-6-sulphonic acid. | Do. |
| 6 | 4'-phenyl-2-aminodiphenyl ether-5-sulphonic acid. | -----do----------------- | Do. |
| 7 | 4'-isooctyl-2-aminodiphenyl ether-5-sulphonic acid. | 2-chloroacetyl-methylamino-8-hydroxy-naphthalene-6-sulphonic acid. | Do. |
| 8 | -----do----------------- | 2-chloroacetyl-methylamino-5-hydroxy-naphthalene-7-sulphonic acid. | Orange. |
| 9 | 4'-($\beta$-dimethyl-propyl)-2-aminodiphenyl ether-4-sulphonic acid. | 2-chloroacetyl-isoamylamino-5-hydroxy-naphthalene-7-sulphomic acid. | Do. |
| 10 | -----do----------------- | 2-bromoacetyl-isoamylamino-5-hydroxy-naphthalene-7-sulphonic acid. | Do. |
| 11 | 4'-tert.amyl-2-aminodiphenyl ether-5-sulphonic acid. | 2-chloroacetyl-benzylamino-5-hydroxy-naphthalene-7-sulphonic acid. | Orange. |
| 12 | 4'-(4''-methylcyclohexyl)-2-aminodiphenyl ether-4-sulphonic acid. | 2-(N-chloroacetyl-N-4'-chlorobenzylamino)-8-hydroxynaphthalene-6-sulphonic acid. | Scarlet. |
| 13 | 4'-benzyl-2-aminodiphenyl ether-5-sulphonic acid. | 2-(N-bromoacetyl-N-4'-bromobenzylamino)-8-hydroxynaphthalene-6-sulphonic acid. | Do. |
| 14 | -----do----------------- | 2-(N-bromoacetyl-N-4'-methylbenzylamino)-5-hydroxynaphthalene-7-sulphonic acid. | Orange. |
| 15 | 4'-tert.amyl-2-aminodiphenyl ether-5-sulphonic acid. | 2-bromoacetyl-butylamino-8-hydroxy-naphthalene-6-sulphonic acid. | Scarlet. |
| 16 | -----do----------------- | 2-chloroacetyl-butylamino-8-hydroxy-naphthalene-6-sulphonic acid. | Do. |
| 17 | 4'-tert.amyl-2-aminodiphenyl ether 4-sulphonic acid. | -----do----------------- | Do. |
| 18 | 4'-isooctyl-2-aminodiphenyl ether-5-sulphonic acid. | -----do----------------- | Do. |
| 19 | 4'-dodecyl-2-aminodiphenyl ether-5-sulphonic acid. | 2-chloroacetyl-methylamino-8-hydroxy-naphthalene-6-sulphonic acid. | Do. |

EXAMPLE 5

33.5 parts of 4'-tert.-amyl-2-aminodiphenyl ether-5-sulphonic acid are diazotised as described in Example 2 and the diazo suspension is poured at 0° into a solution of the sodium salt of 32.9 parts of 2-benzylamino-8-hydroxynaphthalene-6-sulphonic acid and 25 parts of sodium carbonate in 600 parts of water. The mixture is stirred for several hours, 220 parts of sodium chloride are sprinkled in and the dyestuff which precipitates is filtered off.

The dyestuff obtained is dissolved at 70° in 3000 parts of water and 1000 parts of alcohol. 76 parts of crystallised sodium acetate are added to the solution and it is cooled to 5°. 45.2 parts of chloroacetyl chloride are added dropwise at 5 to 10° while stirring vigorously. The reaction mixture is then stirred for 1 hour and the alcohol and part of the water are evaporated off in vacuo. As soon as the solution has been concentrated to 2000 parts, 100 parts of sodium chloride are sprinkled in. After cooling, the precipitated dyestuff is filtered off and purified chromatographically. It is identical with the dyestuff obtained according to Example 2.

EXAMPLE 6

100 parts of previously well wetted wool are entered at 50° into a dyebath which, in 3000 parts of water, contains 2 parts of the dyestuff obtained according to Example 2 and 6 parts of 30% acetic acid. The bath is brought to the boil within 15 minutes and dyeing is performed for 45 minutes at the boil. The bath is completely exhausted and a very pure scarlet wool dyeing is obtained. It is distinguished by good fastness to light and excellent wet fastness properties.

What is claimed is:

1. A monoazo dyestuff of the formula

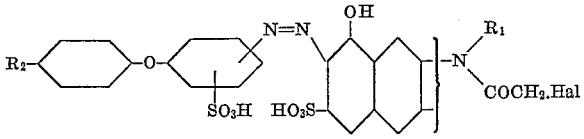

wherein
the —N=N— group is in one of the positions ortho and para to the ether bridge,
$R_1$ is a member selected from the group consisting of alkyl with not more than 5 carbon atoms, benzyl, p-chlorobenzyl, p-bromobenzyl and p-methylbenzyl,
$R_2$ is a member selected from the group consisting of alkyl with at least 4 and not more than 18 carbon atoms, cyclohexyl, p-methylcyclohexyl, benzyl and phenyl,
with the proviso that the sum of the carbon atoms of $R_1$ and $R_2$ is at least 9, and
Hal is a member selected from the group consisting of chlorine and bromine.

2. A monoazo dyestuff of the formula

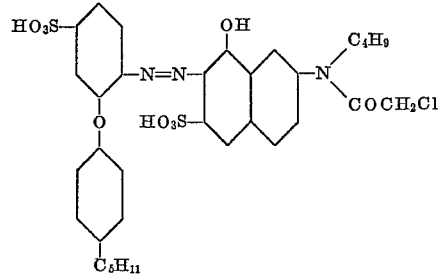

3. A monoazo dyestuff of the formula

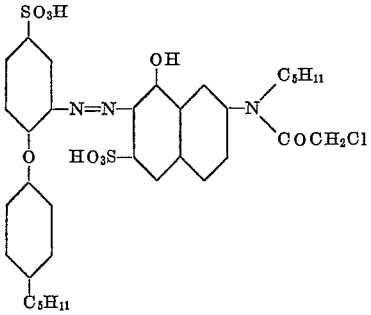

4. A monoazo dyestuff of the formula

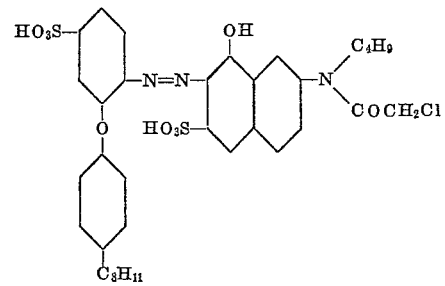

5. A monoazo dyestuff of the formula
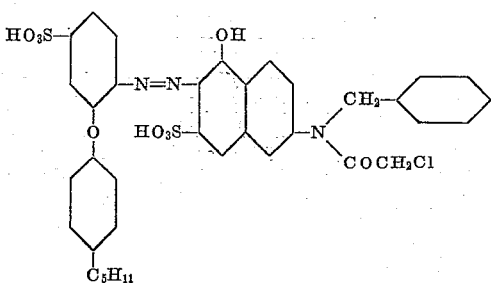
References Cited in the file of this patent
UNITED STATES PATENTS
| | | |
|---|---|---|
| 1,824,686 | Richard | Sept. 22, 1931 |
| 2,055,074 | Fleischhauer | Sept. 22, 1936 |
| 2,273,517 | Fischer et al. | Feb. 17, 1942 |
FOREIGN PATENTS
| | | |
|---|---|---|
| 609,117 | Germany | Feb. 7, 1935 |
| 182,594 | Switzerland | May 1, 1936 |

UNITED STATES PATENT OFFICE
CERTIFICATE OF CORRECTION

Patent No. 3,143,541  August 4, 1964

Meinrad Hürbin et al.

It is hereby certified that error appears in the above numbered patent requiring correction and that the said Letters Patent should read as corrected below.

Column 6, lines 65 to 75, the lower portion of the formula should appear as shown below instead of as in the patent:

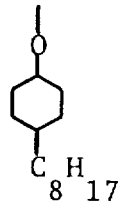

Signed and sealed this 2nd day of November 1965.

(SEAL)
Attest:

ERNEST W. SWIDER
Attesting Officer

EDWARD J. BRENNER
Commissioner of Patents